United States Patent [19]
Scott

[11] 3,794,392
[45] Feb. 26, 1974

[54] BEARING SEAL
[76] Inventor: Gene W. Scott, 9103 E. Garvey Blvd., Rosemead, Calif. 91770
[22] Filed: Apr. 10, 1972
[21] Appl. No.: 242,407

[52] U.S. Cl................... 308/36.1, 277/208, 287/88
[51] Int. Cl. ........................................... F16c 33/74
[58] Field of Search...308/36.1, 72; 287/88; 277/208, 277/209

[56] References Cited
UNITED STATES PATENTS

| 3,119,624 | 1/1964 | Freed | 277/208 |
| 3,378,287 | 4/1968 | Ulderup | 287/88 |
| 2,308,613 | 1/1943 | Le Tourneau | 287/88 |
| 3,030,134 | 4/1962 | Gair | 287/88 |
| 3,086,801 | 4/1963 | Herbenar | 287/88 |
| 3,220,756 | 11/1965 | Templeton | 308/36.1 |
| 2,271,777 | 2/1942 | Nathan | 277/209 |

FOREIGN PATENTS OR APPLICATIONS

| 79,114 | 9/1962 | France | 308/36.1 |
| 1,382,763 | 11/1964 | France | 308/36.1 |

Primary Examiner—Charles J. Myhre
Assistant Examiner—Barry Grossman
Attorney, Agent, or Firm—Donald D. Mon

[57] ABSTRACT

Labyrinth seals for rod-end swivel bearings having outer annular lips of a yieldable elastomer and inner annular lips of lesser height. The seals are mounted on metal plates which have parallel planar surfaces perpendicular to a central bore which accommodates standard rod-end attachment bolts, the planar surfaces react the tensile pre-load in the bolt and also pre-load and deflect the yieldable lips of the seals against the rod-end bearing housing to seal the swivel action against external contamination, and to retain grease or other lubricant in the swivel bearing area.

4 Claims, 6 Drawing Figures

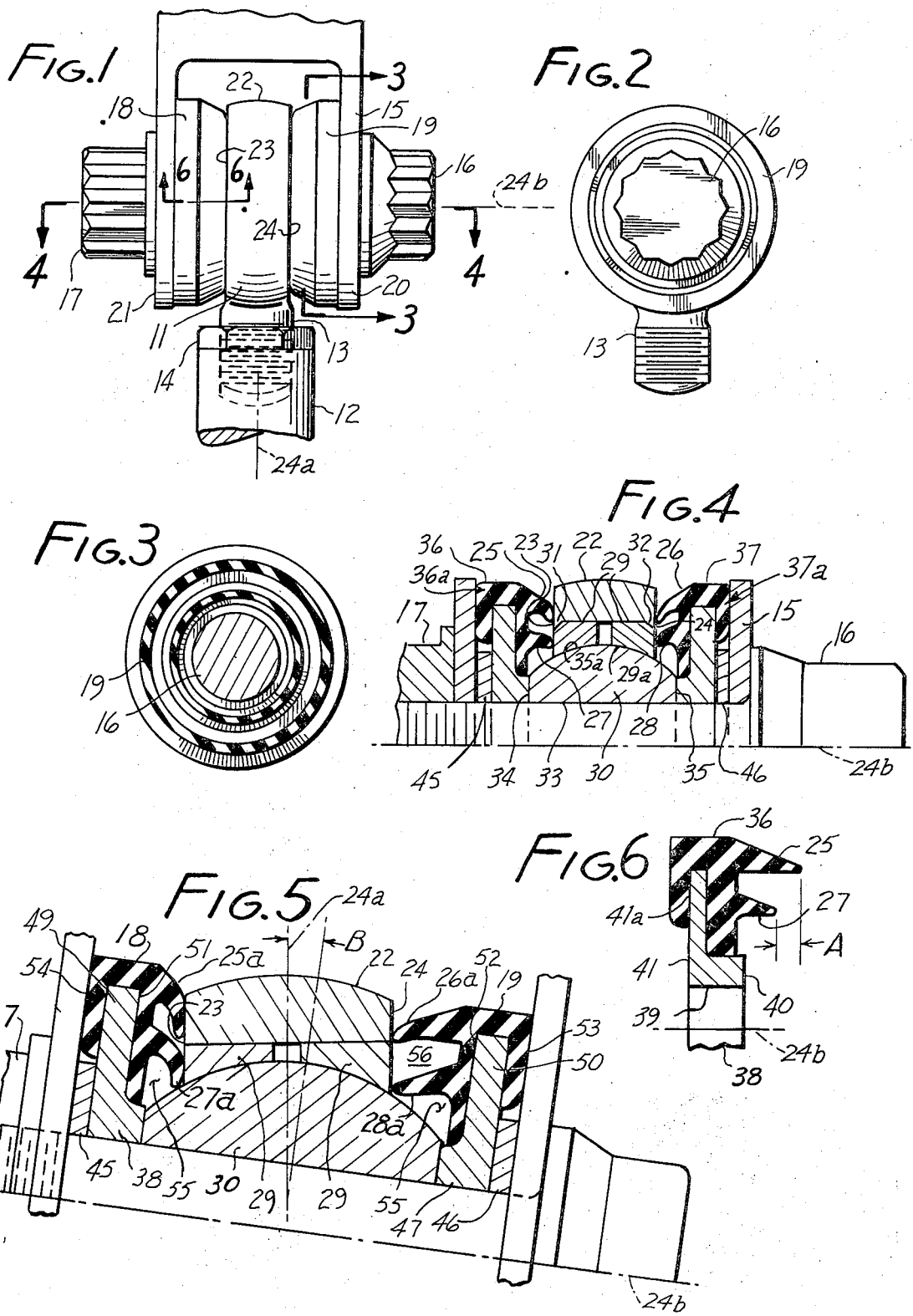

BEARING SEAL

BACKGROUND OF THE INVENTION

This invention relates to seals for rod-end swivel bearings.

Rod-ends are well known in the mechanical arts as a fitting which is fixed to the end of a rod having mechanical motion, but requiring some degree of freedom of rotation. Therefore, the rod-end bearing incorporates a ball-like member housed in a chamber, the ball-like member being free to swivel about an axis. It also has a bore coaxial with the axis which is perpendicular to two sides of the ball-like member. This bore accommodates a bolt suitable for attachment to the rod to any mechanical means. Such rod-end bearings have always been subject to contamination from the environment, particularly when used as controls in aircraft or on machinery in particularly dusty areas, such as earth-moving equipment and material-handling equipment.

An object of this invention is to provide a seal for rod-end bearings which will prevent contamination by external dust or other materials, while also retaining the lubricant.

A further object of this invention is to provide a seal for rod-end bearings which will yield to accommodate swivelling of a rod-end swivel bearing. Yet another object of the invention is to provide a seal with two peripheral flexible lips to aid in retention of lubricant within a swivel rod-end bearing and to provide an isolation compartment to exclude dust. Another object of this invention is to provide a flexible lip seal which is mounted on rigid plates to accommodate pre-loading of a mechanical linking bolt to the rod-end swivel bearing. Yet another object of the invention is to provide for pre-loading of the flexible labyrinth seal by the rod-end mounting bolt.

Still another object of the invention is to provide a flexible seal which is demountable from its mounting plates for easy removal in the case of wear or damage.

The above and other features of this invention will be fully understood from the following detailed description and accompanying drawings in which:

FIG. 1 is a front view of the preferred embodiment of the invention;

FIG. 2 is a side view of the embodiment of FIG. 1;

FIG. 3 is a cross-sectional view taken on line 3—3 of FIG. 1;

FIG. 4 is a cross-section taken on line 4—4 of FIG. 1;

FIG. 5 is a partial view of the cross-section of FIG. 4 shown in swiveled position; and FIG. 6 is a fragmentary section of the embodiment of FIG. 1 taken on line 6—6.

DISCLOSURE OF THE INVENTION

In FIG. 1 an assembly is shown which incorporates the preferred embodiment of the invention in assembly with typical mechanical components which would comprise a complete functional usage of the invention.

A rod-end swivel fitting 11 is fitted to the end of a rod 12 by means of threaded attachment means 13 (a stud). The rod-end fitting 11 is locked in position with a jam nut 14. Clevis member 15 is held in assembly with rod-end swivel fitting 11 by means of bolt 16 and assembled nut 17. Seals 18 and 19 are assembled on bolt 16 between clevis arms 20 and 21. Outer bearing member 22 includes a pair of peripheral sealing surfaces 23, 24 which are parallel to each other and to a rod axis 24a. They are located on opposite sides of the rod axis. When the rod axis is normal to mounting axis 24b, the sealing surfaces are perpendicular to it.

The outer bearing member includes a split bearing 29 which has an internal spherical bearing surface which is at least a portion of a sphere with its center of curvature on axis 24b. The split bearings are staked in place at 31, 32, and retain a mounting ball 30. The mounting ball includes a bolt passage 33 and a pair of abutment faces 34, 35 on opposite sides of the rod axis. The mounting ball also includes an external bearing surface 35a, which is at least a portion of a sphere with substantially the same radius, and the same center of curvature, as that of bearing surface 29a.

Attachment means 13 is integral with the outer bearing member and extends along the rod axis.

Seals 36 and 37 include sealing rings 36a and 37a which have sealing lips 25, 26, 27 and 28 in pairs. The lips are made of elastomeric material. FIG. 6 is a fragmentary cross-section of a typical seal before application in a swivel joint. Outermost lip 25 projects further axially along mounting axis 24b toward the peripheral sealing surface of the outer bearing member than the innermost lip 27 by dimension A. All lips are peripheral around the mounting axis, and the lips of each pair are radially spaced from one another.

The sealing rings are mounted with a fluid-sealing fit to metal spacers 38, 47, respectively. Because they are identical, only spacer 38 will be described in detail. It includes an aperture 39, and abutment faces 40, 41 are at each end. A peripheral flange 41a mounts the sealing ring. The abutment face bears against the abutment face of the mounting ball. The axial location of face 40 relative to the tips of the sealing lips determines the compression of the lips.

Washers 45 and 46, acting in conjunction with clevis member arms 20 and 21, transmit a clamping force between nut 17 and bolt 16 to press spacers 38 and 47 against the mounting ball to preload the seals 18 and 19. Although the seals may be bonded to the spacers 38 and 47, for convenience, a preferred method of retaining the seals is to reduce the cross-section dimension of the spacers 38 and 47 in the areas 49 and 50, and then the seals 18 and 19 are molded with grooves 51 and 52 with return shoulders 53 and 54 so that the return shoulders snap over the periphery of the metallic retainer members 38 and 47, thus self-retaining the seals 18 and 19 and making seals 18 and 19 easily replaceable in case of wear or other forms of damage.

In assembly, an inner peripheral lubricant reservoir is formed between the mounting ball 30 and inner lips 27 and 28, thus providing a continuing supply of lubricant to the bearing. In referring to FIG. 5, it can be seen that, when the mounting ball 30 is rotated through an angle B, lip 25 and lip 27 become deflected to lip 25a and lip 27a producing increased deflection, while lips 26 and 28 straighten out to 26a and 28a while still remaining in contact with side 24 of the bearing housing 22 of swivel fitting 11. Sealing lips 25, 27, 26 and 28 are all made in a tapered configuration so that the thin end will be facing toward the bearing housing 22, and the direction of taper is along the mounting axis. This type of tapered beam design for the lips 25, 26, 27 and 28 enables them to deflect toward the axis of the mounting ball 30 to provide uniform pre-load under the installation pressures. The lips 25, 26, 27 and 28 must be designed to remain in contact with the surfaces 23 and 24 of the bearing housing, whether on the loaded or unloaded side during swivelling, over the maximum amount of swivel of the rod-end swivel fitting 11. An outer peripheral isolation compartment 56 is formed between the lips, which provides a dust seal to protect the lubricant reservoir.

As alternate methods of design of the seal, the lips may be cemented individually to the spacers 38 and 47, or a section containing just the lips might be molded directly to the spacers 38 and 47.

In use, the rod-end swivel fitting 11 is assembled to a rod-end 12 and locked in position with nut 14. The clevis member 15 is slipped over the rod-end swivel fitting with washers 45 and 46 in place, and the seals 18 and 19 are placed between the swivel fitting 11 and the washers 45 and 46. Bolt 16 is slipped through the bores of the clevis arms 21 and 22, the washers 45 and 46, the seals 18 and 19, and the mounting ball 30 so that its threads may be engaged by nut 17. Nut 17 is then torqued so that the seals 18 and 19 are preloaded against the faces 24 and 23 of the bearing housing 22 of the rod-end swivel fitting 11. During this assembly procedure, grease is packed between the mounting ball 30 surface and the inner lips 27 and 28 of the seals 18 and 19. The assembly may then be hooked into its next assembly so that swivelling of the ball will never completely unload the sealing lips 25, 26, 27 and 28 of the seals 18 and 19, the inner lip retaining the grease in contact with the mounting ball 30 for lubrication, and the outer lips sealing out dust, dirt or other contaminants from adverse action on the mounting ball 30 or its lubricant. The compartment between them acting further to isolate the contaminants from the lubricants.

This invention is not to be limited by the embodiment shown in the drawings and described in the description, which are given by way of example and not of limitation, but only in accordance with the scope of the appended claims.

I claim:

1. A seal for a swivel rod-end fitting which includes a mounting ball having an external bearing surface which is at least a portion of a sphere, with a bolt passage extending through the ball along a mounting axis which includes the center of curvature of said sphere, an outer bearing member having an internal bearing surface which is at least a portion of a sphere of substantially the same radius as the first-named bearing surface and in bearing relationship therewith, attachment means on said outer bearing member for attaching a rod thereto, the rod extending along a rod axis, and being free to swivel in the plane defined by said two axes around the intersection of said axes at the said center of curvature, the outer bearing member including a pair of peripheral sealing surfaces which extend around the mounting axis on opposite sides of the rod axis, said sealing surfaces being parallel to each other and to the rod axis and, when the axes are normal to each other, being perpendicular to the mounting axis, said ball including a pair of abutment faces, one on each side of the rod axis, said seal comprising: a metal spacer having an aperture therethrough and an abutment face at each end thereof, one of said abutment faces being adapted to bear against an abutment face of said mounting ball; a circular peripheral flange on said spacer; an elastomeric sealing ring making a fluid-sealing rigid fit with said flange and including a pair of flexible sealing lips extending peripherally around and spaced from the aperture and so disposed and arranged as to bear against a peripheral sealing surface on the outer bearing member, the sealing lips being radially spaced apart from one another, the outermost sealing lip projecting farther from the peripheral flange than the innermost sealing lip in the direction of the mounting axis, the spacer terminating axially within the innermost one of said sealing lips whereby both sealing lips make contact with the peripheral sealing surface when the spacer contacts the ball, and maintain their contact when the rod swivels in a plane defined by the rod axis and the mounting axis, whereby an inner peripheral lubricant reservoir is formed within the innermost of the sealing lips adjacent to the ball, and an outer peripheral isolation compartment is formed between the two sealing lips and the peripheral sealing surface.

2. A seal according to claim 1 in which said lips are thicker at their ends closer to the peripheral flange than at their free ends.

3. A swivel fitting for a rod-end fitting comprising: a mounting ball having an external bearing surface which is at least a portion of a sphere, with a bolt passage extending through the ball along a mounting axis which includes the center of cruvature of said sphere; an outer bearing member having an internal bearing surface which is at least a portion of a sphere of substantially the same radius as the first-named bearing surface and in bearing relationship therewith; attachment means on said outer bearing member for attaching a rod thereto, the rod extending along a rod axis, and being free to swivel in the plane defined by said center of curvature, the outer bearing member including a pair of peripheral sealing surfaces which extend around the mounting axis on opposite sides of the rod axis, said sealing surfaces being parallel to each other and to the rod axis and, when the axes are normal to each other, being perpendicular to the mounting axis, said ball including a pair of abutment faces, one on each side of the rod axis; and a pair of seals, each seal comprising: a metal spacer having an aperture therethrough and an abutment face at each end thereof, one of said abutment faces being adapted to bear against an abutment face of said mounting ball, a circular peripheral flange on said spacer, an elastomeric sealing ring making a fluid-sealing rigid fit with said flange and including a pair of flexible sealing lips extending peripherally around and spaced from the aperture and so disposed and arranged as to bear against a peripheral sealing surface on the outer bearing member, the sealing lips being radially spaced apart from one another, the outermost sealing lip projecting farther from the peripheral flange than the innermost sealing lip in the direction of the mounting axis, the spacer terminating axially within the innermost one of said sealing lips whereby both sealing lips make contact with the peripheral sealing surface when the spacer contacts the ball, and maintain their contact when the rod swivels in a plane defined by the rod axis and the mounting axis, whereby an inner peripheral lubricant reservoir is formed within the innermost of the sealing lips adjacent to the ball, and an outer peripheral isolation compartment is formed between the two sealing lips and the peripheral sealing surface, there being a sealing ring on each side of the mounting ball.

4. A seal according to claim 1 in which said lips are thicker at their ends closer to the peripheral flange than at their free ends.

* * * * *